US012811527B2

(12) United States Patent
Wang et al.

(10) Patent No.: US 12,811,527 B2
(45) Date of Patent: Nov. 24, 2026

(54) ENERGY ELECTRONIC LOCK AND FEEDBACK CONTROL CIRCUIT THEREOF, AND CONTROL METHOD AND NEW ENERGY AUTOMOBILE

(71) Applicant: Changchun Jetty Automotive Technology Co., Ltd., Changchun (CN)

(72) Inventors: Chao Wang, Jilin (CN); Chunpeng Li, Jilin (CN)

(73) Assignee: CHANGCHUN JETTY AUTOMOTIVE TECHNOLOGY CO., LTD., Changchun (CN)

( * ) Notice: Subject to any disclaimer, the term of this patent is extended or adjusted under 35 U.S.C. 154(b) by 229 days.

(21) Appl. No.: 18/714,451

(22) PCT Filed: Nov. 23, 2022

(86) PCT No.: PCT/CN2022/133668
§ 371 (c)(1),
(2) Date: May 29, 2024

(87) PCT Pub. No.: WO2023/098529
PCT Pub. Date: Jun. 8, 2023

(65) Prior Publication Data
US 2025/0023498 A1 Jan. 16, 2025

(30) Foreign Application Priority Data
Nov. 30, 2021 (CN) ........................ 202111473507.5

(51) Int. Cl.
*H02P 23/14* (2006.01)
*B60L 53/16* (2019.01)

(52) U.S. Cl.
CPC ............. *H02P 23/14* (2013.01); *B60L 53/16* (2019.02)

(58) Field of Classification Search
CPC ....... H02P 23/14; B60L 53/16; B60L 2240/36
See application file for complete search history.

(56) References Cited

U.S. PATENT DOCUMENTS 8,523,589 B2 * 9/2013 Kurumizawa .......... B60L 50/16
439/304
9,156,363 B2 * 10/2015 Nakajima ............. B60L 3/0023
(Continued)

FOREIGN PATENT DOCUMENTS

CN 205301412 U 6/2016
CN 106451398 A 2/2017
(Continued)

OTHER PUBLICATIONS

Japan Patent Office, "Office Action" issued for corresponding Japanese Patent Application 2024-532513, mailed on Jun. 3, 2025, 14 Pages (English Translation Included).
(Continued)

*Primary Examiner* — Thai T Dinh
(74) *Attorney, Agent, or Firm* — Hanley, Flight & Zimmerman, LLC

(57) ABSTRACT

The present disclosure provides a new energy electronic lock and a feedback control circuit thereof, and a control method and a new energy automobile, applied to a new energy automobile, comprising: a driving module for receiving a locking signal and generating a lock driving signal, and driving an electronic lock to be locked through the lock driving signal; a control unit which is connected to a feedback pin of the driving module and is configured to obtain first driving current during the locking process of the electronic lock and to determine a locking state of the electronic lock according to the first driving current. The disclosure achieves to inform the user of the new energy automobile of the locking of the charging plug, so as to
(Continued)

avoid the virtual connection of the charging plug, and ensure the charging quality of the new energy automobile.

16 Claims, 10 Drawing Sheets

(56) References Cited

U.S. PATENT DOCUMENTS

| | | | | |
|---|---|---|---|---|
| 9,216,656 | B2 * | 12/2015 | Nakajima | H01R 13/6397 |
| 9,281,618 | B2 * | 3/2016 | Kurumizawa | B60L 3/0084 |
| 9,533,586 | B2 * | 1/2017 | Kahara | B60L 53/16 |
| 2012/0252250 | A1 * | 10/2012 | Kurumizawa | B60L 50/16 439/304 |
| 2014/0169865 | A1 * | 6/2014 | Kurumizawa | B60L 3/0046 403/322.1 |
| 2014/0300320 | A1 * | 10/2014 | Nakajima | B60L 3/0023 320/109 |
| 2015/0295355 | A1 * | 10/2015 | Temmesfeld | B60L 3/04 439/304 |
| 2016/0056589 | A1 * | 2/2016 | Kagawa | B60L 3/0069 361/42 |
| 2017/0294771 | A1 | 10/2017 | Iida | |

FOREIGN PATENT DOCUMENTS

| | | | |
|---|---|---|---|
| CN | 107143223 | A | 9/2017 |
| CN | 206888714 | U | 1/2018 |
| CN | 108270425 | A | 7/2018 |
| CN | 109802527 | A | 5/2019 |
| CN | 110609505 | A | 12/2019 |
| CN | 209837956 | U | 12/2019 |
| CN | 212518763 | U | 2/2021 |
| CN | 213149132 | U | 5/2021 |
| CN | 114132193 | A | 3/2022 |
| JP | 2012209099 | A | 10/2012 |
| JP | 2014087198 | A | 5/2014 |
| JP | 2014195385 | A | 10/2014 |
| JP | 2017187397 | A | 10/2017 |

OTHER PUBLICATIONS

European Patent Office, “Extended European Search Report” issued on Mar. 28, 2025 for counterpart European patent application No. 22900334.8, 20 pages.

International Searching Authority, “International Search Report,” issued in connection with International Patent Application No. PCT/CN2022/133668, dated Feb. 14, 2023, 6 pages. [English translation provided].

International Searching Authority, “Written Opinion,” issued in connection with International Patent Application No. PCT/CN2022/133668, dated Feb. 14, 2023, 8 pages. [English translation provided].

The State Intellectual Property Office of People’s Republic of China, “First Office Action and Search Report,” issued in connection with Chinese Patent Application No. 202111473507.5, dated Nov. 1, 2023, 16 pages. [English translation provided].

The State Intellectual Property Office of People’s Republic of China, “Second Office Action and Search Report,” issued in connection with Chinese Patent Application No. 202111473507.5, dated Apr. 27, 2024, 20 pages. [English translation provided].

European Patent Office, “Communication Pursuant to Article 94(3) EPC,” issued in connection with European Patent Application No. 22900334.8, dated Nov. 25, 2025, 8 pages.

Thailand Patent Office, “First Office Action,” issued in connection with Thailand Patent Application No. 2401003473, dated Sep. 23, 2025, 8 pages. [with English translation].

“Motor protection functions—Electrical Installation Wiki Guide,” dated Apr. 18, 2021, 4 pages.

Mexican Institute of Industrial Property, “First Office Action,” issued in connection with Mexico Patent Application No. MX/a/2024/006609, dated Jul. 24, 2026, 12 pages. [with Machine English translation].

* cited by examiner

ENERGY ELECTRONIC LOCK AND FEEDBACK CONTROL CIRCUIT THEREOF, AND CONTROL METHOD AND NEW ENERGY AUTOMOBILE

RELATED DISCLOSURES

The present disclosure is a U.S. National Stage of International Application PCT/CN2022/133668, filed on Nov. 23, 2022, which claims priority to Chinese Patent application No. 202111473507.5, filed on Nov. 30, 2021, both of which are hereby incorporated by reference in their entireties.

TECHNICAL FIELD

The present disclosure relates to the technical field of an electronic lock, which can be applied to the field of a new energy vehicle, and in particular to a new energy electronic lock and a feedback control circuit thereof, and a control method and a new energy automobile.

BACKGROUND

It is stipulated in the charging standard for new energy electric automobiles that it is required to use an electronic locking mechanism to ensure a good connection between a charging head and a vehicle body charging socket to achieve safe charging of the new energy electric automobiles.

However, the existing new energy automobile electronic lock does not have a circuit that can synchronize the working state of the electronic lock to the control center of the vehicle, so when the charging plug of the new energy automobile is not normally inserted into the charging socket of the new energy automobile during the charging process, or when the charging plug cannot be locked, the new energy automobile is not normally charged, thus the user of the new energy automobile cannot get feedback, and thus lose a lot of charging time.

SUMMARY

In view of the above problem of the prior art, an object of the invention is to provide a feedback control circuit of a new energy electronic lock, a control method and an electronic lock, to solve the problem in the prior art that the working state of the electronic lock cannot be synchronized to the control center of the vehicle, resulting in the charging plug of the new energy automobile that cannot be pulled out or cannot be locked during the charging process.

In order to solve the above technical problem, the specific technical scheme of the present disclosure is:

In an aspect, the disclosure provides a feedback control circuit of a new energy electronic lock, applied to a new energy automobile, and including:

- a driving module for receiving a locking signal and generating a lock driving signal, and driving an electronic lock to be locked through the lock driving signal;
- a control unit which is connected to a feedback pin of the driving module and is configured to obtain first driving current during the locking process of the electronic lock and to determine a locking state of the electronic lock based on the first driving current.

As an embodiment of the present disclosure, the electronic lock includes a self-feedback unit;

- the self-feedback unit is configured to generate a pulse signal or an analog voltage signal representing the locking state of the electronic lock;
- the control unit is further configured to determine the locking state of the electronic lock based on a duty cycle ratio of the pulse signal or magnitude of the analog voltage signal.

As an embodiment of the present disclosure, an amplifying circuit and a sampling module are further provided between the control unit and the driving module;

- the amplifying circuit is connected to the feedback pin of the driving module, and the amplifying circuit is configured to pull the initial driving current in the locking process of the electronic lock up to generate a voltage, which is then amplified to obtain an amplified voltage;
- the sampling module is configured to convert the amplified voltage into the first driving current to be transmitted to the control unit.

As an embodiment of the present disclosure, the sampling module is further configured to transmit the pulse signal or the analog voltage signal to the control unit.

As an embodiment of the present disclosure, the amplifying circuit includes:

- an operational amplifier which is connected with an analog ground and a VCC; and
- a limit resistor which is connected to the feedback pin of the driving module, and the other end of which is grounded;
- the limit resistor pulls the initial driving current up to the voltage and inputs the voltage to the operational amplifier.

As an embodiment of the present disclosure, the operational amplifier includes:

- an operational chip;
- a balance resistor which is connected to a high voltage side of the limit resistor and a non-inverting input end of the operational chip respectively;
- an external resistor which is connected to a low voltage side of the limit resistor and an inverting input end of the operational chip respectively; and
- a feedback resistor which is coupled to the inverting input end of the operational chip and an output end of the operational chip.

As an embodiment of the present disclosure, the sampling module includes:

- a voltage-dividing current limiting circuit which is connected to the output end of
- the operational chip; and
- a filtering circuit which is connected to the voltage-dividing current limiting circuit;
- the voltage-dividing current limiting circuit is configured to convert the amplified voltage into the first driving current and then input the first driving current into the filtering circuit;
- the filtering circuit is configured to filter noise fluctuation of the first driving current and then input it to the control unit.

As an embodiment of the present disclosure, the voltage-dividing current limiting circuit includes a first voltage-dividing current limiting resistor and a second voltage-dividing current limiting resistor;

- one end of the first voltage-dividing current limiting resistor is coupled to the output end of the operational chip;
- one end of the second voltage-dividing current limiting resistor is coupled to the other end of the first voltage-dividing current limiting resistor;

the other end of the second voltage-dividing current limiting resistor is grounded.

As an embodiment of the present disclosure, the filtering circuit includes:

a filtering capacitor;

one end of the filtering capacitor is coupled to the second voltage-dividing current limiting resistor, and the other end thereof is grounded.

As an embodiment of the present disclosure, in which further includes:

a voltage detection circuit which is connected to a voltage input pin of the driving module; and the voltage detection circuit is configured to detect a voltage state of the VCC inputted to the voltage input pin.

As an embodiment of the present disclosure, the voltage detection circuit includes:

a first detection resistor connected to the voltage input pin, and a second detection resistor connected to the first detection resistor;

the other end of the second detection resistor is connected to an analog ground pin of the driving module;

the other end of the first detection resistor is connected with the VCC;

a connection point between the first detection resistor and the second detection resistor is connected to the control unit.

As an embodiment of the present disclosure, in which further includes:

an overtemperature protection circuit which is connected to an overtemperature protection pin of the driving module;

the overtemperature protection pin outputs a temperature signal corresponding to the temperature of the driving module to the overtemperature protection circuit; and the overtemperature protection circuit is configured to perform voltage pull-up and filtering of the temperature signal and then input it to the control unit.

As an embodiment of the present disclosure, the overtemperature protection circuit includes a pull-up resistor and an overtemperature protection capacitor;

one end of the pull-up resistor is connected to one end of the overtemperature protection capacitor;

the other end of the pull-up resistor is connected with a TTL power supply;

the other end of the overtemperature protection capacitor is grounded;

a connection point between the pull-up resistor and the overtemperature protection capacitor is connected to the control unit and the overtemperature protection pin respectively.

As an embodiment of the present disclosure, the control unit is further configured to:

determine the locking state of the electronic lock corresponding to the first driving current based on the first driving current and pre-configured corresponding relationship between a preset first driving current interval and the locking state of the electronic lock.

In another aspect, the present disclosure further provides a control method of a feedback control circuit of a new energy electronic lock, applied to the feedback control circuit of the new energy electronic lock according to any of the above embodiment, the control method including:

receiving a locking signal and driving an electronic lock to be locked based on the lock driving signal;

obtaining first driving current during the locking process of the electronic lock;

determining a locking state of the electronic lock based on the first driving current, and performing a predetermined action.

As an embodiment of the present disclosure, the determining a locking state of the electronic lock based on the first driving current, further includes:

determining the locking state of the electronic lock corresponding to the first driving current based on the first driving current and pre-configured corresponding relationship between a preset current interval and the locking state of the electronic lock.

As an embodiment of the present disclosure, the preset current interval includes a safe interval and a dangerous interval;

the pre-configured corresponding relationship between the preset current interval and the locking state of the electronic lock is:

determining that the electronic lock is in an electronic locked-rotor state when the first driving current is in the threshold of the dangerous interval;

determining that the electronic lock is in its own fault state when the first driving current is higher than the threshold of the dangerous interval;

determining that the electronic lock is in an open-circuit state when the first driving current is lower than the threshold of the safe interval;

determining that the electronic lock is in a normal working state when the first driving current is in the threshold of the safe interval.

As an embodiment of the present disclosure, the performing a predetermined action further includes:

transmitting a locked-rotor alarm instruction when the electronic lock is in an electronic locked-rotor state;

transmitting an electronic lock abnormal instruction when the electronic lock is in its own fault state;

transmitting an electronic lock open-circuit instruction when the electronic lock is in an open-circuit state.

As an embodiment of the present disclosure, the control method further includes:

obtaining a pulse signal or an analog voltage signal from the self-feedback unit of the electronic lock;

determining the locking state of the electronic lock based on a duty cycle ratio of the pulse signal or magnitude of the analog voltage signal.

As an embodiment of the present disclosure, the determining the locking state of the electronic lock based on a duty cycle ratio of the pulse signal or magnitude of the analog voltage signal, includes:

determining the locking state of the electronic lock corresponding to a duty cycle ratio of the pulse signal based on the duty cycle ratio of the pulse signal and pre-configured corresponding relationship between a preset duty cycle ratio interval and the locking state of the electronic lock; or determining the locking state of the electronic lock corresponding to the analog voltage signal based on the analog voltage signal and pre-configured corresponding relationship between a preset voltage interval and the locking state of the electronic lock.

In another aspect, the present disclosure further provides an electronic lock for a new energy automobile, and the electronic lock is provided with the feedback control circuit of the new energy electronic lock based on any of the above aspect.

In another aspect, the present disclosure further provides a new energy automobile, which is provided with the electronic lock of the new energy automobile.

In another aspect, the present disclosure further provides a computer device including a memory, a processor and a computer program stored in the memory, the computer program, when being run by the processor, executes instructions of the control method described above.

In another aspect, the present disclosure further provides a computer storage medium storing a computer program therein, that, when run by the processor of the computer device, executes the instructions of the control method described above.

By the above technical scheme, the sampled current in the locking process of the rotor motor can be obtained, and the locking state of the rotor motor can be determined based on the sampled current, in this way, the user of the new energy automobile can be informed of the locking state of the charging plug, avoiding the virtual connection of the charging plug, and ensuring the charging quality of the new energy automobile.

In order to make the above and other objects, features, and advantages of the present disclosure be more obvious and easier to understand, hereinafter detailed description is given by combining optimized embodiments in conjunction with the accompanying drawings.

BRIEF DESCRIPTION OF THE DRAWINGS

To illustrate more clearly the embodiments of the present disclosure or the technical schemes of the prior art, a brief description of the accompanying drawings in the embodiments or the prior art will be given below. Obviously, the accompanying drawings described below are only some embodiments described in the present disclosure. For those of ordinary skill in the art, other drawings can also be obtained without any creative labor from these drawings.

DESCRIPTION OF REFERENCE NUMERALS

Figure 1:
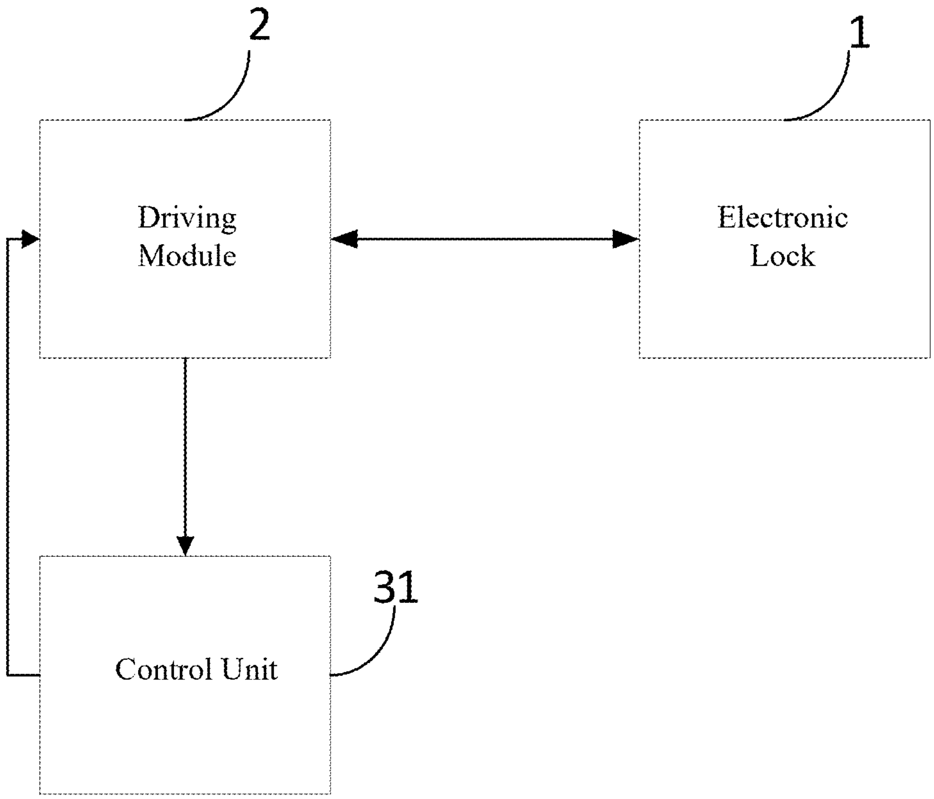
FIG. 1 shows a schematic diagram of a basic system of a feedback control circuit of a new energy electronic lock in the embodiment of the disclosure.

01. first diode;
02. second diode;
1. electronic lock;
11. rotor motor;
12. self-feedback unit;
2. driving module;
21. input pin;
22. output pin;
23. feedback pin;
24. voltage input pin;
25. overtemperature protection pin;
26. analog ground pin;
3. industrial control module;
31. control unit;
32. locking signal transmission unit;
4. amplifying circuit;
41. operational amplifier;
411. operational chip;
412. balance resistor;
413. external resistor;
414. feedback resistor;
415. limit resistor;
5. sampling module;
51. voltage-dividing current limiting circuit;
511. first voltage-dividing current limiting resistor;
512. second voltage-dividing current limiting resistor;
6. filtering circuit;
61. filtering capacitor;
7. voltage detection circuit;
71. first detection resistor;
72. second detection resistor;
8. overtemperature protection circuit;
81. pull-up resistor;
82. overtemperature protection capacitor;
1202: computer device;
1204: processor;
1206: memory;
1208: driving mechanism;
1210. input/output module;
1212: input device;
1214: output device;
1216: presentation device;
12112: graphical user interface;
1220: network interface;
1222: communication link;
1224: communication bus.

DESCRIPTION OF THE EMBODIMENTS

Hereinafter the technical scheme in the embodiments of the present disclosure will be described clearly and integrally in combination with the accompanying drawings in the embodiments of the present disclosure, and obviously the described embodiments are merely part of the embodiments, not all of the embodiments. Any other embodiment obtained by those skilled in the art based on the embodiments of the present disclosure without paying any creative labor fall within the protection scope of the present disclosure.

It should be noted that the terms “first,” “second” and the like in the description and claims herein and in the above-mentioned drawings are used to distinguish between similar objects and are not necessarily used to describe a particular order or precedence. It should be understood that the data so used may be interchanged where appropriate so that the embodiments described herein can be implemented in an order other than those illustrated or described herein. Furthermore, the terms "including" and "having" and any variations thereof are intended to cover non-exclusive inclusions, such as, for example, a process, a method, an apparatus, a product or a device including a series of steps or units need not to be limited to those steps or units that are clearly listed, but may include other steps or units that are not explicitly listed or inherent to these processes, methods, products or devices.

With the strong popularity of green energy development, especially in recent years, the development of new energy electric automobiles, the advocacy of green travel, and the realization of a comprehensive transformation of transportation energy have become a trend in the global transportation industry. And the trend also increasingly tends to high-voltage, high-current DC fast high-power charging. Therefore, it is particularly stipulated in the charging standard for new energy electric automobiles that it is required to use an electronic locking mechanism to ensure a good connection between a charging head and a vehicle body charging base to complete safe recharge work of the new energy electric automobiles. At the same time, when major automakers design and produce new energy automobiles, the new energy charging socket must be equipped with the standard electronic lock of the charging socket, and it is clearly required to monitor and feedback the working status of the socket electronic lock and the body charging cover electronic lock, so there is an urgent need to design a safe and stable electronic lock working detection circuit to meet the design requirements of major automakers.

In order to solve the above requirements, an embodiment of the present disclosure provides a feedback control circuit of a new energy electronic lock, which can achieve to sample the driving current in the electronic lock 1 and to feed back the locking state of the rotor motor 11 in the electronic lock 1 based on the driving current. It should be noted that the electronic lock 1 includes a rotor motor 11 and a self-feedback unit 12. When the electronic lock 1 is locked, the driving force is provided by the rotor motor 11, so the measurement of the driving current is actually to measure the driving current on the rotor motor 11, and the self-feedback unit 12 can obtain a pulse signal or an analog signal on the rotor motor 11.

FIG. 1 is a schematic diagram of a basic system of a feedback control circuit of a new energy electronic lock in the embodiment of the disclosure. The feedback control circuit of the new energy electronic lock disclosed in the present disclosure can be applied to the charging socket, or can be applied to the other sockets on the new energy automobile, the present disclosure does not limit the application field of the feedback control circuit of the new energy electronic lock, specifically including:

- a driving module 2 for receiving a locking signal and generating a lock driving signal, and driving the electronic lock 1 to be locked through the lock driving signal;
- a control unit 31 which is connected to a feedback pin 23 of the driving module and is configured to obtain first driving current during the locking process of the electronic lock 1 and to determine a locking state of the electronic lock 1 based on the first driving current.

It should be noted that the driving module 2 in the present disclosure can be a driving chip with several pins. In the driving module 2, there is at least an H bridge composed of 4 mos tubes. Through the pairwise combination of 4 mos tubes, bidirectional driving of the electronic lock 1 can be realized, and the specific implementation process will not be repeated here.

Figure 2:
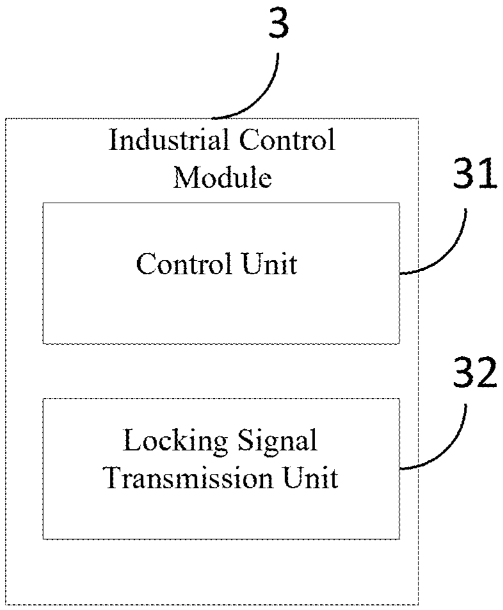
FIG. 2 shows a schematic diagram of a control unit of a feedback control circuit of a new energy electronic lock in the embodiment of the disclosure.

FIG. 2 shows a schematic diagram of a control unit of a feedback control circuit of a new energy electronic lock. In the present disclosure, the locking signal can be transmitted by the control unit 31 or can be transmitted by the industrial control module 3 integrated with the control unit 31. The industrial control module 3 can further be provided with a locking signal transmission unit 32 which is specially configured to transmit the locking signal. The locking signal transmission unit 32 is connected to the control unit 31 in the industrial control module 3 to realize data feedback control.

Figure 3:
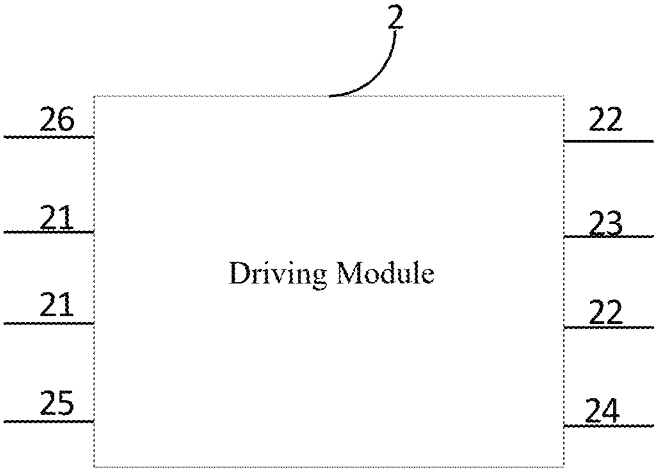
FIG. 3 shows a schematic diagram of a driving module of a feedback control circuit of a new energy electronic lock in the embodiment of the disclosure.

FIG. 3 shows a schematic diagram of a driving module of a feedback control circuit of a new energy electronic lock. In the present disclosure, two input pins 21 of the driving module 2 receive the locking signal, and then two output pins 22 of the driving module 2 are connected to the rotor motor 11 to provide voltage to the rotor motor 11. The initial driving current transmitted to the rotor motor 11 by the output pin 22 on the driving module 2 can be synchronized to a signal feedback pin 23 through the internal construction of the driving module 2. When the rotor motor 11 is locked, the driving current of the rotor motor 11 in the electronic lock module 1 is changed. When the rotor motor 11 is stable, for example after 33*s*, the feedback pin 23 in the driving module 2 can read the initial driving current of the rotor motor 11.

Figure 4:
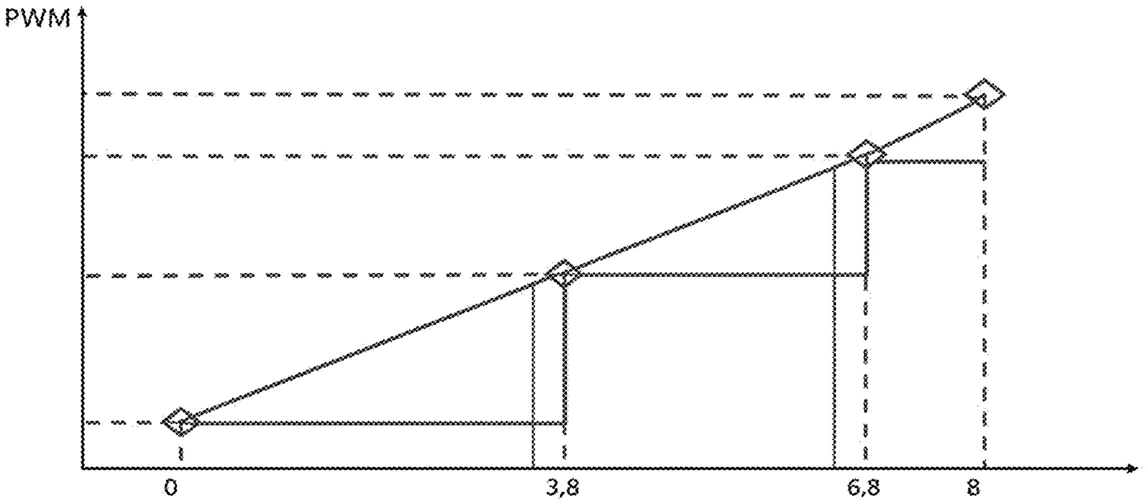
FIG. 4 shows a schematic diagram of self-state feedback of a feedback control circuit of a new energy electronic lock in the embodiment of the disclosure.

FIG. 4 shows a schematic diagram of self-state feedback of a feedback control circuit of a new energy electronic lock. The self-feedback unit 12 is configured to generate a pulse signal or an analog voltage signal representing the locking state of the electronic lock. It should be noted that the electronic lock in the present disclosure can generate PWM pulse wave, which can be obtained by the self-feedback unit 12, in FIG. 4, the horizontal coordinate is the stroke distance of the lock, and the vertical coordinate is the PWM duty ratio of the self-feedback of the electronic lock 1. The first point in the horizontal coordinate is the corresponding PWM duty ratio when the electronic lock stroke is 0, and the last point in the horizontal coordinate is the corresponding PWM duty ratio when the electronic lock stroke is the maximum. A code of the PWM duty ratio is preset in the control unit 31, so after the PWM of the electronic lock 1 is obtained by the self-feedback unit 12, it is transmitted to the control unit 31, and the control unit can determine the locking angle of electronic lock 1 based on the PWM.

The control unit 31 can also be electrically connected to the feedback pin 23 and reads the sampled current corresponding to the initial driving current. In the control unit 31, a code is configured to determine a locking state of the electronic lock 1 based on the first driving current.

Therefore, through the above method, the first driving current of the rotor motor 11 can be obtained, and the locking state of the rotor motor 11 can be determined based on the first driving current.

Figure 5:
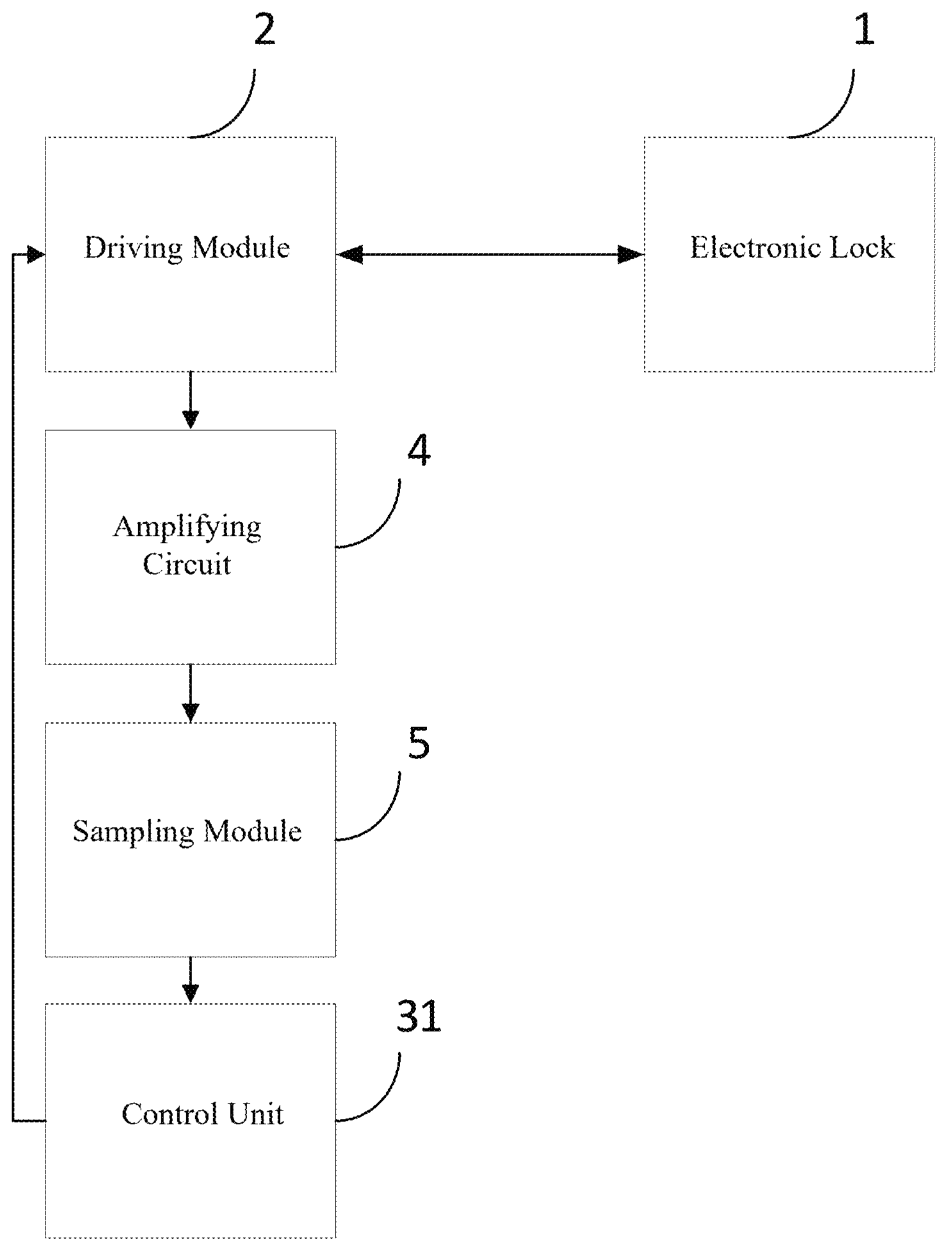
FIG. 5 shows a schematic diagram of a compact system of a feedback control circuit of a new energy electronic lock in the embodiment of the disclosure.

As an embodiment of the present disclosure, FIG. 5 shows a schematic diagram of a compact system of a feedback control circuit of a new energy electronic lock. An amplifying circuit 4 and a sampling module 5 are further provided between the driving module 2 and the control unit 31.

The driving module 2 can directly obtain the initial driving current of electronic lock 1 and transmit the initial driving current to the amplifying circuit 4. The amplifying circuit amplifies the initial driving current into the first driving current and then transmits it to the sampling module 5, and the sampling module 5 samples the first driving current and transmits it to the control unit 31.

Figure 6:
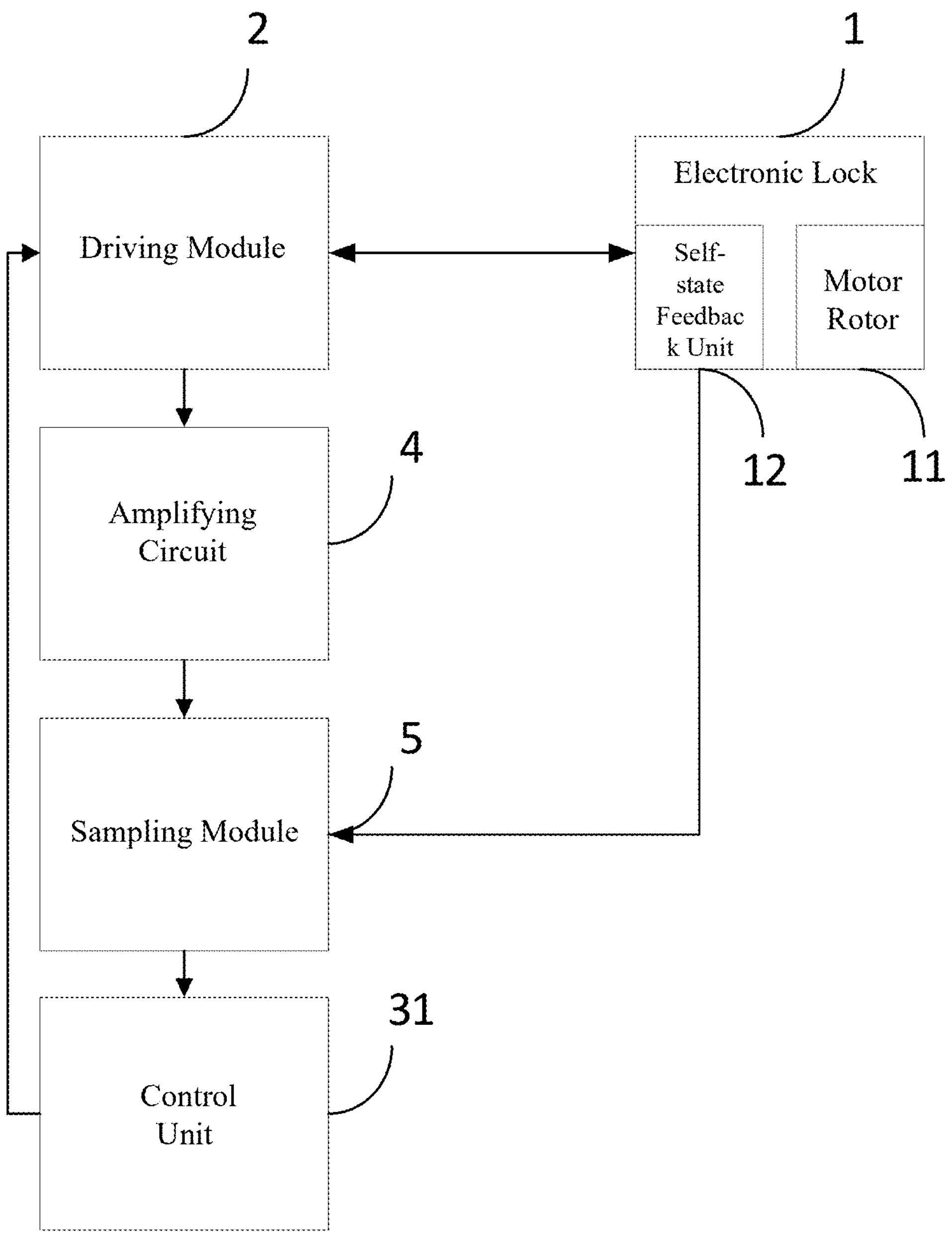
FIG. 6 shows a schematic diagram of an optimized system of a feedback control circuit of a new energy electronic lock in the embodiment of the disclosure.

As an embodiment of the present disclosure, FIG. 6 shows a schematic diagram of an optimized system of a feedback control circuit of a new energy electronic lock. A second diode 02 and a sampling module 5 are provided between the self-feedback unit 12 and the control unit 31. For ease of understanding, the first diode 01 and the second diode 02 are omitted in FIG. 6.

The anode of the second diode 02 is connected to the self-feedback unit 12, and the cathode thereof is connected to the sampling module 5, for rectifying the initial driving current.

The sampling module 5 is configured to limit and filter the initial driving current to obtain the sampled current, and then input the sampled current to the control unit 31.

Figure 7:
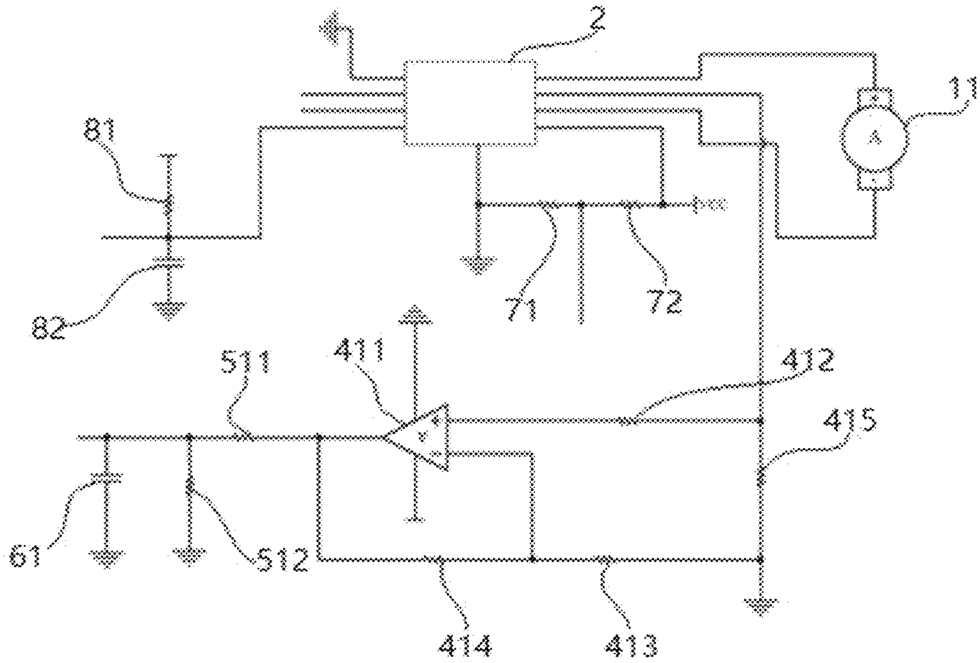
FIG. 7 shows a schematic diagram of a compact circuit of a feedback control circuit of a new energy electronic lock in the embodiment of the disclosure.

As an embodiment of the present disclosure, FIG. 7 shows a schematic diagram of a compact circuit of a feedback control circuit of a new energy electronic lock. In the embodiment, the amplifying circuit 4 and the sampling module 5 are further provided between the control unit 31 and the driving module 2.

The amplifying circuit 4 is connected to the feedback pin 23 of the driving module 2, and the amplifying circuit 4 is configured to pull the initial driving current in the locking process of the electronic lock up to generate a voltage, which is then amplified to obtain an amplified voltage.

The sampling module 5 is configured to convert the amplified voltage into the first driving current.

The filtering circuit 6 is configured to rectify the first driving current and then transmit it to the control unit 31.

The control unit 31 is configured to determine the locking state of the rotor motor 11 based on the first driving current.

It should be noted that the embodiment can solve the problem that the initial driving current of the rotor motor 11 is not high enough to reach the current resolution of the control unit 31. In order to facilitate description of the process of amplifying the current and distinguish the current before and after amplification, the current running on the rotor motor 11 in this embodiment is regarded as the initial driving current. Of course, the initial driving current is no different from the sampled current in the previous embodiment, and both represent the current of rotor motor 11 during the locking process of the rotor motor 11.

Figure 8:
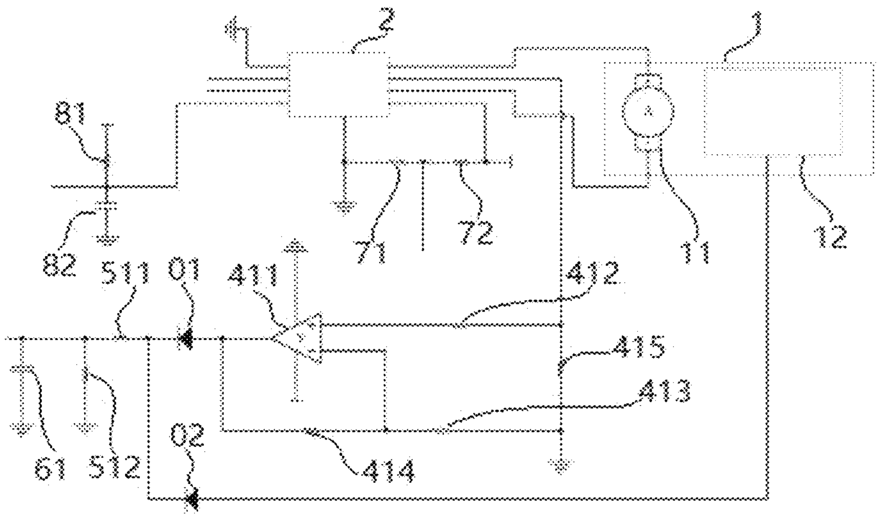
FIG. 8 shows a schematic diagram of an optimized circuit of a feedback control circuit of a new energy electronic lock in the embodiment of the disclosure.

As an embodiment of the present disclosure, FIG. 8 shows a schematic diagram of an optimized circuit of a feedback control circuit of a new energy electronic lock. In the embodiment, the amplifying circuit 4, the first diode 01 and the sampling module 5 are further provided between the control unit 31 and the driving module 2.

The amplifying circuit 4 is connected to the feedback pin 23 of the driving module 2, and the amplifying circuit 4 is configured to amplify initial driving current in the locking process of the electronic lock 1 after pulling the initial driving current up to generate a voltage, to obtain an amplified voltage.

The anode of the first diode 01 is connected to the amplifying circuit 4, and the cathode thereof is connected to the sampling module 5, and the first diode 01 is configured to rectify the amplified voltage.

The sampling module 5 is configured to convert the amplified voltage into the first driving current to be transmitted to the control unit 31.

The control unit 31 is configured to determine the locking state of the rotor motor 11 based on the sampled current.

The self-feedback unit 12 can also obtain a PWM pulse signal and an analog voltage signal of the electronic lock in the locking process, and transmit the PWM pulse signal and the analog voltage signal to the sampling module 5 through the second diode 02, and the sampling module 5 samples the PWM pulse signal and the analog voltage signal and transmit them to the filtering circuit 6, and the filtering circuit 6 transmits the pulse signal and analog voltage signal to the control unit 31.

It should be noted that the embodiment can solve the problem that the initial driving current of the rotor motor 11 is not high enough to reach the current resolution of the control unit 31, and can solve the problem of detecting the locking angle of the electronic lock 1 and can detect the magnitude of the analog voltage signal on electronic lock 1. In order to facilitate description of the process of amplifying the current and distinguish the current before and after amplification, the current running on the rotor motor 11 in this embodiment is regarded as the initial driving current. Of course, the initial driving current is no different from the sampled current in the previous embodiment, and both represent the current of rotor motor 11 during the locking process of the rotor motor 11.

Hereinafter, all the circuits in FIG. 7 and FIG. 8 are described in detail:

The amplifying circuit 4 first converts the initial driving current into a voltage through the limit resistor 415, then after the voltage is amplified by an amplifying circuit 4 to obtain the amplified voltage. It should be noted that the amplifying circuit 4 is not limited in the present disclosure, and any circuit that can realize voltage amplification can be configured as the amplifying circuit 4 of this embodiment, and it can be integrated or split.

When the amplified voltage is obtained by the amplifying circuit 4, the sampling module 5 can perform current limiting and voltage division on the amplified voltage, thereby acquiring the sampling current. It should be noted that the sampled current in this embodiment differs from the initial driving current only at the peak value, and the rest does not differ.

The control unit 31 receives the sampled current and determines the locking state of the rotor motor 11 based on the sampled current.

As an embodiment of the present disclosure, the amplifying circuit 4 includes:

- an operational amplifier 41 which is connected with an analog ground and a VCC; and
- a limit resistor 415 which is connected to the feedback pin of the driving module 2, and the other end of which is grounded.

The limit resistor 415 pulls the initial driving current up to generate the voltage and inputs the voltage to the operational amplifier 41.

In this embodiment, the limit resistor 415 can adjust, based on the input range of the operational amplifier 41, for example, the input range of the operational amplifier 41 to be about 1 V, the initial driving current to be 0.1 A, and then the limit resistor 415 is at 10Ω. The resistance value of the limit resistor 415 is not limited in the present disclosure, and the limit resistor 415 in the present disclosure has the function of limiting the current to the voltage as need. Therefore, the limit resistor 415 can also be not only one, but also more than one resistor connected in series and in parallel, so that the circuits that are limited and transmitted to the operational amplifier 41 by those skilled in the art, as required, fall within the scope of protection herein.

As an embodiment of the present disclosure, the operational amplifier 41 includes: an operational chip 411;

a balance resistor 412 which is connected to a high voltage side of the limit resistor 415 and a non-inverting input end of the operational chip 411 respectively;

an external resistor 413 which is connected to a low voltage side of the limit resistor 415 and an inverting input end of the operational chip 411 respectively; and a feedback resistor 414 which is coupled to the inverting input end of the operational chip 411 and an output end of the operational chip 411.

The feedback resistor 414 is connected to the anode of the first diode 01.

It should be noted that the high voltage side and low voltage side in the embodiment correspond to the grounded and ungrounded ends of the limit resistor 415, and the voltage passes from the high voltage side to the low voltage side and then to the ground to form a circuit.

In the embodiment of the present disclosure, a non-inverting proportional operational amplifier chip, and those skilled in the art can also design an inverting proportional operational amplifier chip according to needs. The type of the operational chip 411 is not limited in the present disclosure, and any chip that can amplify the voltage can replace the non-inverting proportional operational amplifier chip in the present disclosure. In the present disclosure, the resistance value of the balance resistor 412 is equal to the ratio of the external resistor 413 to the feedback resistor 414, and magnification times of the voltage by the operational chip 411 can be adjusted by the balance resistor 412. Therefore, the specific value of the balance resistor 412 is not limited in the present disclosure, but as a preferred implementation, the balance resistor 412 can be at 10 kΩ, the external resistor 413 can be at 10 kΩ, and the feedback resistor 414 can be at 1 MΩ.

The operational chip 411 is also connected to a 12 V power supply and an analog ground, and the specific model of the operational chip 411 is not limited in the present disclosure.

As an embodiment of the present disclosure, the sampling module 5 includes:

a voltage-dividing current limiting circuit 51 which is connected to the cathode of the first diode 01 and the cathode of the second diode 02 respectively;

a filtering circuit 6 which is connected to the voltage-dividing current limiting circuit 51.

The voltage-dividing current limiting circuit 51 is configured to convert the amplified voltage into the sampled current and then input it into the filtering circuit 6.

The filtering circuit 6 is configured to filter noise fluctuation of the sampled current and then input it to the control unit 31.

It should be noted that the voltage-dividing current limiting circuit 51 in the present disclosure divides the amplified voltage based on the input current limit of the control unit 31, to protect the control unit 31.

The filtering circuit 6 is to reduce the noise interference caused by the amplifier chip when performing amplification.

As an embodiment of the present disclosure, the voltage-dividing current limiting circuit 51 includes a first voltage-dividing current limiting resistor 511 and a second voltage-dividing current limiting resistor 512.

One end of the first voltage-dividing current limiting resistor 511 is connected to the cathode of the first diode 01 and the cathode of the second diode 02 respectively.

One end of the first voltage-dividing current limiting resistor 511 is coupled to the output end of the operational chip 411.

One end of the second voltage-dividing current limiting resistor 512 is coupled to the other end of the first voltage-dividing current limiting resistor 511.

The other end of the second voltage-dividing current limiting resistor 512 is grounded.

As an optimized embodiment, the resistance values of the first voltage-dividing current limiting resistor 511 and the second voltage-dividing current limiting resistor 512 can both be 30 kΩ.

In this embodiment, the first voltage-dividing current limiting resistor 511 and the second voltage-dividing current limiting resistor 512 are connected in parallel to divide the amplified voltage, and in the same way several resistors can be connected in series on a branch of the first voltage-dividing current limiting resistor 511, or several resistors can be connected in parallel on a branch of the second voltage-dividing current limiting resistor 512. Of course, those skilled in the art can establish by themselves the voltage-dividing current limiting circuit 51 according to the needs, and no specific voltage-dividing current limiting circuit 51 is limited in the present disclosure.

As an embodiment of the present disclosure, the filtering circuit 6 includes: a filtering capacitor 61.

One end of the filtering capacitor 61 is coupled to the second voltage-dividing current limiting resistor 512, and the other end thereof is grounded.

In this embodiment, the filtering function of the filtering capacitor 61 itself is utilized to meet the filtering effect at the lowest cost.

As an optimized embodiment, the filtering capacitance can be 0.1 μF.

As an embodiment of the present disclosure, a voltage detection circuit 7 can also be connected to the driving module 2.

The voltage detection circuit 7 is connected to a voltage input pin 21 of the driving module 2.

The voltage detection circuit 7 is configured to detect a voltage state of the VCC inputted to the voltage input pin 24.

In the process of driving the electronic lock 1, stability of the internal voltage of the driving module 2 is very important, and in the new energy automobile, low utilization voltages, such as that below 36 V, are usually integrated in a power supply. For the convenience of explanation, the power supply is named as a small power supply. When the small power supply is in the process of starting and stopping the vehicle, there occurs a probability that due to the sudden change in electrical impedance, the output voltage of the small power supply is abnormal, resulting in the abnormal driving process of the electronic lock 1, and then the driving signal of the H-bridge cannot drive, and the electronic lock 1 cannot be opened, therefore, the voltage input to the driving module 2 needs to be detected to determine whether it is abnormal.

In the embodiment, the voltage detection circuit 7 includes:

a first detection resistor 71 connected to the voltage input pin 21, and a second detection resistor 72 connected to the first detection resistor 71.

The other end of the second detection resistor 72 is connected to an analog ground pin 26 of the driving module 2.

The other end of the first detection resistor 71 is connected with the VCC.

A connection point between the first detection resistor 71 and the second detection resistor 72 is connected to the control unit 31.

It should be noted that the connection point between the first detection resistor 71 and the second detection resistor 72 can be directly detected by the control unit 31. Of course, in the control unit 31, there can be a reference voltage of the VCC that corresponds to the initial value of the current. In this embodiment, the resistance value of the first detection resistor 71 is 100 kΩ, and the resistance value of the second detection resistor 72 is 20 kΩ. Therefore, the electric potential at the connection point between the first detection resistor 71 and the second detection resistor 72 can be obtained according to the voltage division principle of the resistor, and the electric potential can be transmitted to the control unit 31. If the control unit 31 detects that the electric potential is different from that is pre-configured, then the control unit 31 determines that the VCC is abnormal. If the abnormal VCC causes the electronic lock 1 to not work properly, then when the control unit 31 transmits a fault cause, it can transmit the fault cause to the display screen of the new energy automobile.

As an optimized solution, the resistance value of the first detection resistor 71 can be 100 kΩ, and the resistance value of the second detection resistor 72 can be 20 kΩ.

In the present embodiment, an overtemperature protection circuit 8 is further included.

The overtemperature protection circuit 8 is connected to an overtemperature protection circuit 25 of the driving module 2.

The overtemperature protection pin 25 outputs a temperature signal corresponding to the temperature of the driving module 2 to the overtemperature protection circuit 8.

The overtemperature protection circuit 8 is configured to perform voltage pull-up and filtering of the temperature signal and then input it to the control unit 31.

It should be noted that the overtemperature protection circuit 8 in the present disclosure can exist together with the voltage detection circuit 7, or can exist alone. When the driving module 2 receives a VCC larger than that in a normal case, or when there is a surge current, the electronic lock 1 may possibly be burned out, therefore, a peripheral circuit is needed to suppress the temperature rise of the driving module 2 caused by the surge current. It should be noted that the temperature signal in the embodiment of the present disclosure is an electrical signal extracted from the driving module 2, which can be an electrical signal corresponding to the surge current. By suppressing the temperature signal, the high temperature overload in the driving module 2 can be eliminated. The overtemperature protection circuit 8 can suppress the temperature signal, and the overtemperature protection circuit 8 is provided with a pull-up resistor 81, and an uncertain signal such as a temperature signal is clamped to a low level and then is filtered through the capacitor.

As an embodiment of the present disclosure, the overtemperature protection circuit 8 includes a pull-up resistor 81 and an overtemperature protection capacitor 82.

One end of the pull-up resistor 81 is connected to one end of the overtemperature protection capacitor 82.

The other end of the pull-up resistor 81 is connected with a TTL power supply.

The other end of the overtemperature protection capacitor 82 is grounded.

A connection point between the pull-up resistor 81 and the overtemperature protection capacitor 82 is connected to the control unit 31 and the overtemperature protection pin 25 respectively.

It should be noted that the resistance value of the pull-up resistor 81 is thousands of ohms to tens of thousands of ohms, and the other end of the pull-up resistor 81 is connected to a 5 V TTL power supply which can be controlled. That is, when the new energy automobile starts and stops charging, the power supply can be turned on, and when the new energy automobile does not work, the power supply can be turned off to save electricity.

The size of the overtemperature protection capacitor 82 can be selected not less than the limit current of the driving module 2, which is not limited in the present disclosure.

Figure 9:
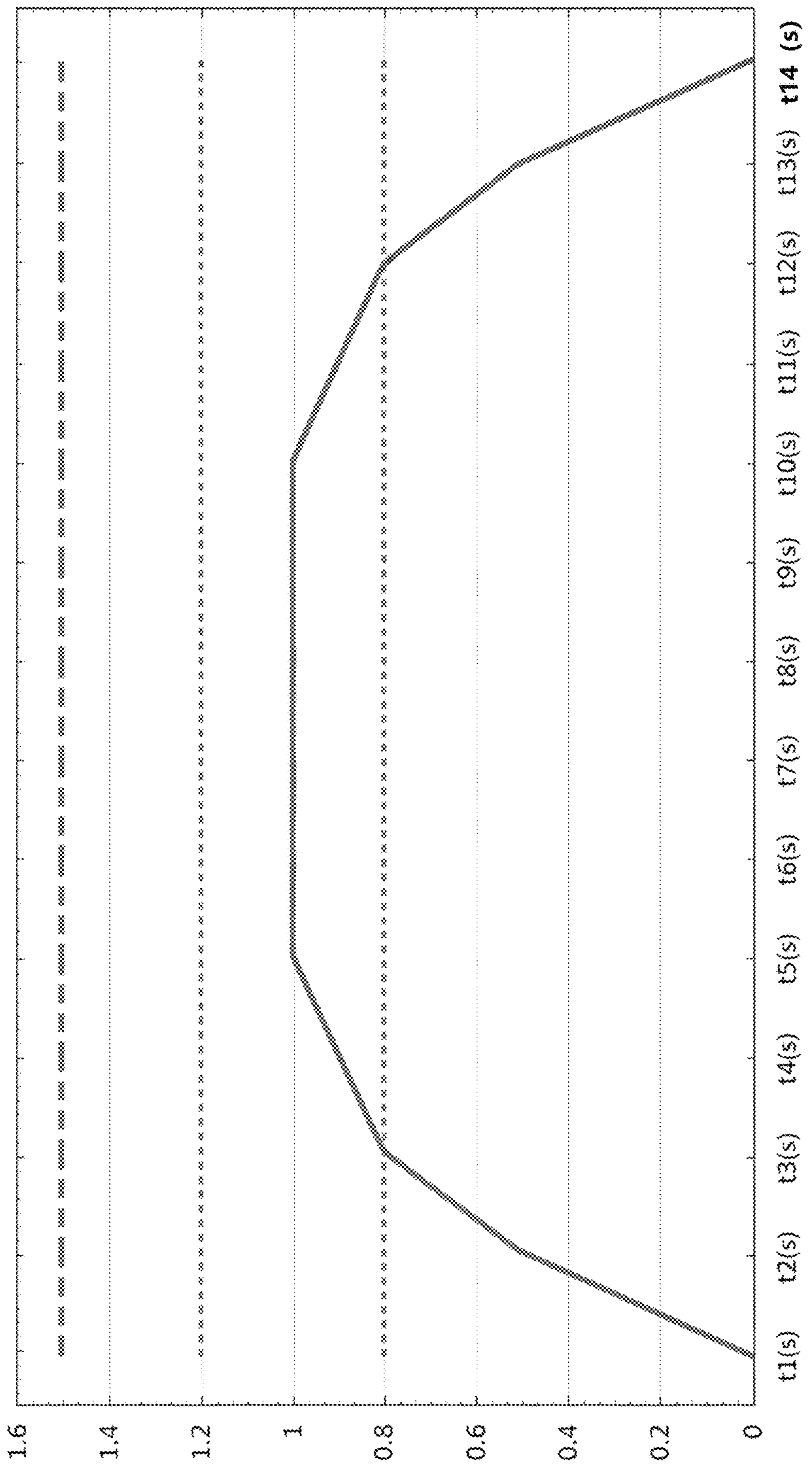
FIG. 9 shows a schematic diagram of a preset current interval of a feedback control circuit of a new energy electronic lock in the embodiment of the disclosure.

As an embodiment of the present disclosure, FIG. 9 shows a schematic diagram of a preset current interval of a feedback control circuit of a new energy electronic lock, representing several preset current intervals configured for the control unit 31.

The control unit 31 determines the locking state of the rotor motor 11 based on the sampled current and the preset current interval, as well as the mapping relationship between the locking state and the preset current interval, in which the preset current interval includes a dangerous interval and a normal interval.

According to FIG. 6, a mapping relationship is configured on the control unit 31, and Table 1 shows a mapping relationship which indicates the corresponding relationship between the sampled current of the electronic lock 1 and its working state. If the sampled current is higher than the threshold of dangerous interval, the control unit 31 transmits a fault indication.

TABLE 1

| Preset interval | Working state |
|---|---|
| Safe interval | Normal work |
| Dangerous interval | Fault of the electronic lock itself |
| Lower than the threshold of safe interval | Electronic lock open-circuit |
| Higher than the threshold of dangerous interval | Fault of driving module |

In the preset current interval, 0.8-1.2 A is the safe interval, that is, the current on the rotor motor 11 is in this interval, indicating normal work.

1.2-1.5 A is the dangerous interval, which means that when the current on the rotor motor 11 is in the current interval, the control unit 31 will determine that the rotor motor 11 is in its own fault state.

When the current on the rotor motor 11 is lower than the threshold of normal interval, the control unit 31 determines that the electronic lock 1 is in an open circuit based on the mapping relationship. That is, the rotor motor 11 cannot be locked, and the open-circuit position needs to be processed, for example, the rotor motor 11 is replaced, to ensure that the new energy automobile can be charged normally.

When the current on the rotor motor 11 is higher than the threshold of dangerous range, the control unit 31 determines that the driving module 2 is in self-fault based on the mapping relationship, resulting in the driving current received by the electronic lock 1 to be too high. This situation may easily cause the temperature of the electronic lock 1 to be too high, and the electronic lock 1 may be burned, so the driving module 2 needs to be replaced to ensure that the new energy automobile can be charged normally.

Through the feedback control circuit of the new energy electronic lock 1 above, the sampled current of the rotor motor 11 can be obtained, and based on the preset current interval where the sampled current is, feedback is given to the user of the new energy automobile, and the input voltage VCC of the driving module 2 can be detected, and the surge current of the driving module 2 can be suppressed, which limits the temperature of the driving module 2 and ensures the safety of the driving module 2.

Figure 10:
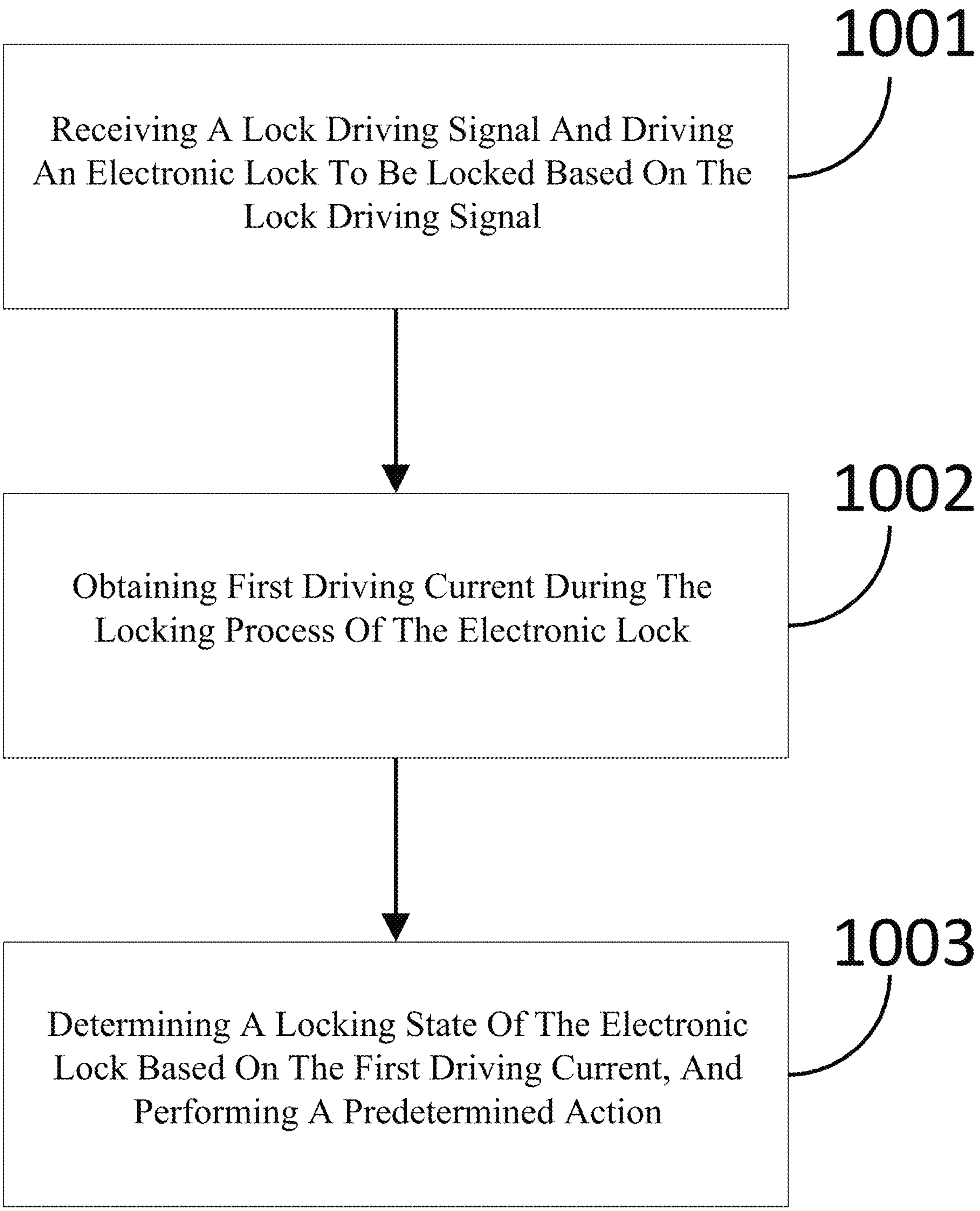
FIG. 10 shows a schematic diagram of a control method of a feedback control circuit of a new energy electronic lock in the embodiment of the disclosure.

The embodiment of the present disclosure further provides a schematic diagram of a control method of a feedback control circuit of a new energy electronic lock as shown in FIG. 10, applied to a feedback control circuit of a new energy electronic lock, the control method including:

a step 1001 of receiving a lock driving signal and driving an electronic lock to be locked based on the lock driving signal;

a step 1002 of obtaining first driving current during the locking process of the electronic lock;

a step 1003 of determining a locking state of the electronic lock based on the first driving current, and performing a predetermined action.

Through the above steps, the sampled current corresponding to the initial driving current in the locking process of the rotor motor can be obtained when the new energy automobile is charging, and the locking state of the electronic lock can be determined based on the sampled current of the electronic lock; in addition, the relevant alarm prompt action can be executed based on the locking state of the electronic lock for the charging plug, which truly realizes the all-round monitoring of the charging socket, improves the user experience, and ensures the charging quality and speed of the new energy automobile.

As an embodiment of the present disclosure, the step of determining a locking state of the electronic lock based on the first driving current further includes:

determine the locking state of the electronic lock corresponding to the first driving current based on the first driving current and pre-configured corresponding relationship between a preset current interval and the locking state of the electronic lock.

As an embodiment of the present disclosure, the preset current interval includes a safe interval and a dangerous interval.

The pre-configured mapping relationship between the preset current interval and the locking state of the rotor motor is:

determining that the rotor motor is in a rotation blocking state when the sampled current is in the threshold of dangerous interval;

determining that the rotor motor is in its own fault state when the sampled current is higher than the threshold of dangerous interval;

determining that the rotor motor is in an open-circuit state when the sampled current is lower than the threshold of safe interval;

determining that the rotor motor is in a normal working state when the sampled current is in the threshold of safe interval.

It should be noted that the mapping relationship is obtained by long-term experiments, that is, there is no artificial rule, and those skilled in the art can use an oscilloscope or an ammeter to make a summary according to the laboratory environment, and obtain the specific parameter range of the preset current interval. In the present disclosure, the safe interval is 0.8-1.2 A, and the dangerous interval is 1.2-1.5 A. However, the safe interval and the dangerous interval are simply explained and give a technical enlightenment to the technical personnel in this field. The technical personnel in this field can adjust the size of the safe interval and the dangerous interval based on the actual internal resistance of the rotor motor and the model of the driving module.

As an embodiment of the present disclosure, the performing a predetermined action further includes:

transmitting a rotation blocking alarm instruction when the rotor motor is in a rotation blocking state;

transmitting an electronic lock abnormal instruction when the rotor motor is in its own fault state;

transmitting an electronic lock open-circuit instruction when the rotor motor is in an open-circuit state.

It should be noted that the predetermined action in the present disclosure can refer to that the new energy automobile user is reminded in the form of a buzzer alarm, or that the instruction is transmitted to the center console of the new energy automobile to instruct the new energy automobile user in a digital form. The manifestation of the instruction is not limited in the present disclosure, and the technicians in this field can design according to their needs.

Figure 11:
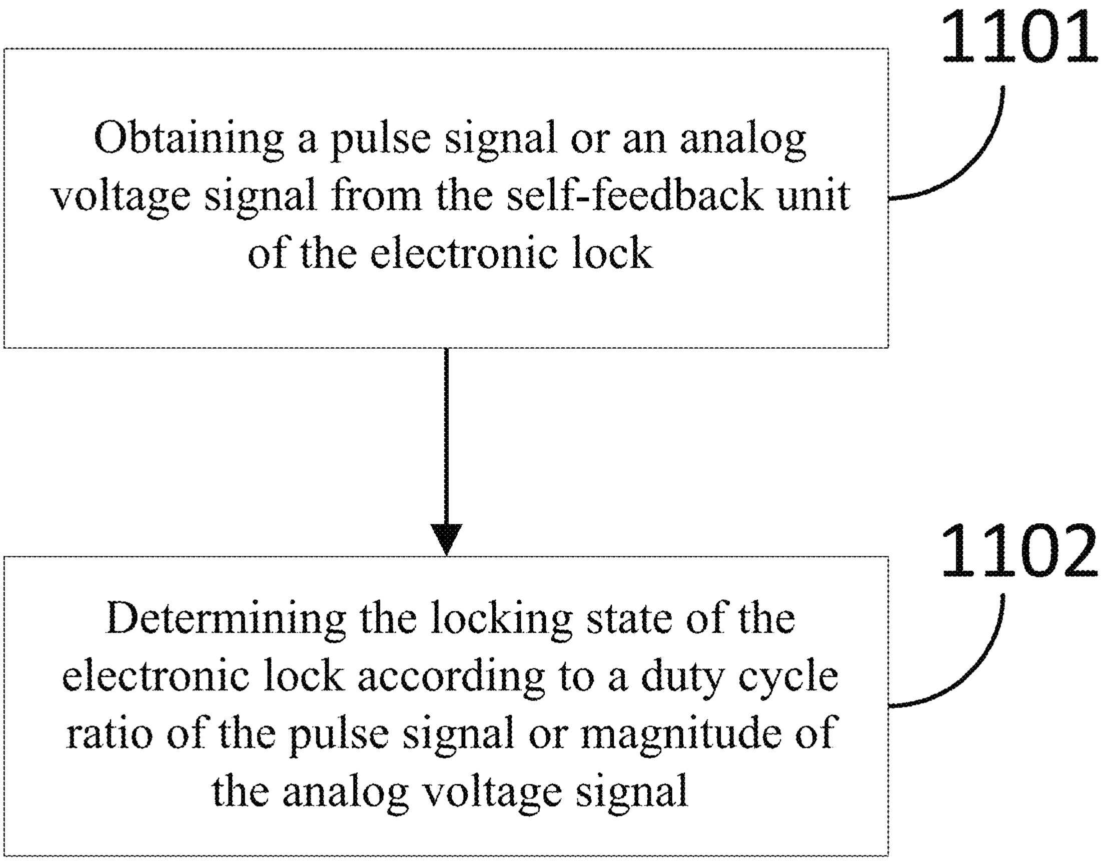
FIG. 11 shows a schematic diagram of an optimized control method of a feedback control circuit of a new energy electronic lock in the embodiment of the disclosure.

As an embodiment of the present disclosure, FIG. 11 shows a schematic diagram of an optimized control method of a feedback control circuit of a new energy electronic lock, the optimized control method further including:

a step S1101 of obtaining a pulse signal or an analog voltage signal from the self-feedback unit of the electronic lock;

a step S1102 of determining the locking state of the electronic lock based on a duty cycle ratio of the pulse signal or magnitude of the analog voltage signal.

The embodiment of the present disclosure further provides an electronic lock for a new energy automobile, the electronic lock being provided with a feedback control circuit of the new energy electronic lock. It should be noted that the electronic lock can be a socket for charging, or an external connection device. For example, when the new energy automobile is charging externally, the electronic lock mentioned in the present disclosure can also be configured.

The electronic lock can also be configured to lock the door and inform the user whether the door is successfully locked to improve the safety performance of the new energy automobile.

The embodiment of the present disclosure further provides a new energy automobile, which is provided with the electronic lock of the new energy automobile.

Figure 12:
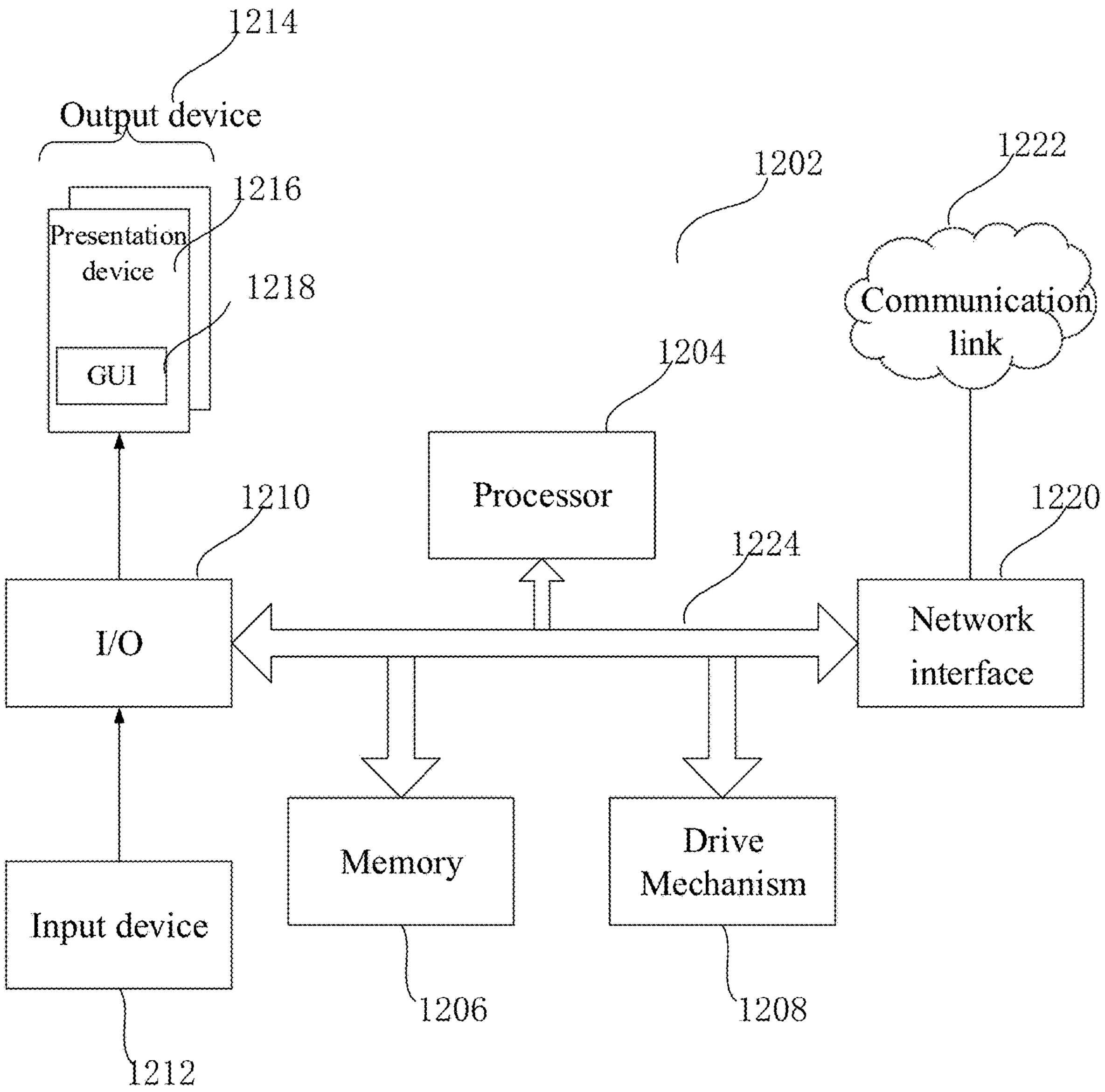
FIG. 12 shows a schematic diagram of a computer device in the embodiment of the disclosure.

FIG. 12 shows a schematic diagram of a computer device in the embodiment of the disclosure, which is a computer device provided in the embodiment of the present disclosure. The computer device 1202 may include one or more processors 1204, such as one or more central processing units (CPUs), each of which may implement one or more hardware threads. The computer device 1202 may also include any memory 1206 for storing any kind of information, such as codes, settings, data, or the like. By way of non-limiting examples, the memory 1206 may include any one or more of the following: any type of RAM, any type of ROM, a flash device, a hard disk, an optical disk, or the like. More generally, any memory may use any technique to store information. Further, any memory may provide a volatile or non-volatile retention of information. Further, any memory may represent a stationary or removable component of the computer device 1202. In one case, when the processor 1204 executes associated instructions stored in any memory or combination of the memories, the computer device 1202 may perform any of the operations of the associated instructions. The computer device 1202 also includes one or more driving mechanisms 1208 for interacting with any memory, such as a hard disk driving mechanism, an optical disc driving mechanism or the like.

The computer device 1202 may also include an input/output module 1210 (I/O) for receiving various inputs (via the input device 1212) and for providing various outputs (via the output device 1214). One particular output mechanism may include a presentation device 1216 and an associated graphical user interface (GUI) 1212. In other embodiments, the input/output module 1210 (I/O), the input device 1212, and the output device 1214 may also be excluded, as just one computer device in the network. The computer device 1202 may also include one or more network interfaces 1220 for exchanging data with other devices via one or more communication links 1222. One or more communication buses 1224 couple the components described above together.

The communication link 1222 may be implemented in any manner, such as over a local area network, a wide area network (e.g., the Internet), a point-to-point connection, or the like, or any combination thereof. The communication link 1222 may include any combination of hardwired links, wireless links, routers, gateway functions, name servers, etc., governed by any protocol or combination of protocols.

Corresponding to the method in FIGS. 10 and 11, the embodiment of the present disclosure further provides a computer readable storage medium which stores a computer program that, when run by a processor, executes the steps of the above method.

The embodiment of the present disclosure further provides computer readable instructions, wherein when the instructions are executed by the processor, the program therein causes the processor to execute the method shown in FIGS. 10 and 11.

It is to be understood that in the various embodiments of the present disclosure, the serial numbers of the processes described above do not mean a sequential order of execution, the sequence in which the processes are executed should be determined in terms of functions and inherent logic thereof, and should not constitute any limitation to the implementation process of the embodiment of the present disclosure.

It should also be understood that in the embodiment of the present disclosure, the term "and/or" is merely an association relationship that describes an associated object, meaning that three relationships may exist. For example, "A" and/or "B" may mean that "A" exists alone, and "A" and "B" exist together and "B" exists alone. In addition, the character "/" in the present disclosure generally indicates that the associated objects are in an "OR" relationship.

Those ordinarily skilled in the art can appreciate that the units and algorithm steps of the examples described in connection with the embodiments disclosed herein can be implemented in electronic hardware, computer software, or a combination of both. In order to clearly illustrate the interchangeability of hardware and software, the composition and steps of each example have been described in the above specification in general terms according to functions. Whether these functions are performed in hardware or software depends on the specific application and design constraints of the technical solution. The professionals may use different methods to implement the described functionality for each particular application, but such implementations should not be considered beyond the scope of the present disclosure.

It will be apparent to those skilled in the art that for convenience and brevity of description, reference may be made to the corresponding procedures in the foregoing method embodiment for the specific operating procedures of the system, the device, and units described above, and the details are not repeated here.

In several embodiments provided herein, it should be understood that the disclosed system, device and method may be implemented in other ways. For example, the embodiment of the above-described device is merely schematic, for example, division of the units is merely a logically functional division, and there may be other division manners in actual implementation, for example multiple units or components can be combined or integrated into another system, or some features can be ignored or not executed. In addition, the coupling or direct coupling or communication connection shown or discussed between one another may be indirect coupling or communication connection through some interfaces, apparatuses or units, may be in an electrical, mechanical or other forms.

The units described as separate elements may or may not be physically separate, the components shown as units may and may not necessarily be physical units, i.e. may be located in one place, or may be distributed over a plurality of network units. Some or all of the units may be selected according to actual needs to achieve the purpose of the embodiment of the present disclosure.

In addition, the individual functional units in the individual embodiments herein may be integrated in one processing unit, or the individual units may be physically present separately, or two or more units may be integrally formed in one unit. The above integrated unit may be implemented in the form of either hardware or a software functional unit.

The integrated unit, if implemented in the form of a software functional unit and sold or used as a stand-alone product, may be stored in a computer readable storage medium. Based on such understanding, the technical scheme herein may be embodied in the form of a software product in essence or in a part contributing to the prior art, or in whole or in part. The computer software product is stored in a storage medium and includes several instructions for causing a computer device (which may be a personal computer, a server, or a network device, or the like) performing all or part of the steps of the method described in various embodiments of the present disclosure. The aforementioned storage medium includes various media capable of storing program codes, such as a USB flash drive, a hard disk, a read-only memory (ROM), a random access memory (RAM), and a magnetic disk or an optical disk.

The disclosure adopts specific embodiments to explain the principle and implementation way of the present disclosure. The above embodiments are described merely for helping to understand the method and core concept of the present disclosure; in addition, a person skilled in the art can, on the basis of the concept of the present disclosure, make modifications to both of the specific embodiments and application scope. In conclusion, contents disclosed herein should not be understood as limitation to the present disclosure.

The invention claimed is:

1. A feedback control circuit of a new energy electronic lock applied to a new energy automobile, comprising:

a driving module for receiving a locking signal and generating a lock driving signal, and driving an electronic lock to be locked through the lock driving signal;

a control unit which is connected to a feedback pin of the driving module and is configured to obtain first driving current during a locking process of the electronic lock and to determine a locking state of the electronic lock based on the first driving current; and a voltage detection circuit which is connected to a voltage input pin of the driving module and is configured to detect a voltage state of a VCC that is input to the voltage input pin, wherein the voltage detection circuit comprises:

a first detection resistor having a first end connected to the voltage input pin, and a second detection resistor having a first end connected to the first end of the first detection resistor;

a second end of the second detection resistor is connected to an analog ground pin of the driving module;

a second end of the first detection resistor is connected with the VCC; and a connection point between the first detection resistor and the second detection resistor is connected to the control unit.

2. The feedback control circuit of the new energy electronic lock according to claim 1, wherein:

the electronic lock includes a self-feedback unit;

the self-feedback unit is configured to generate a pulse signal or an analog voltage signal representing the locking state of the electronic lock; and the control unit is further configured to determine the locking state of the electronic lock based on a duty cycle ratio of the pulse signal or magnitude of the analog voltage signal.

3. The feedback control circuit of the new energy electronic lock according to claim 2, wherein:

an amplifying circuit and a sampling module are further provided between the control unit and the driving module;

the amplifying circuit is connected to the feedback pin of the driving module, and the amplifying circuit is configured to pull the first driving current in the locking process of the electronic lock up to generate a voltage, which is then amplified, to obtain an amplified voltage; and the sampling module is configured to convert the amplified voltage into the first driving current to be transmitted to the control unit.

4. The feedback control circuit of the new energy electronic lock according to claim 3, wherein the sampling module is further configured to transmit the pulse signal or the analog voltage signal to the control unit.

5. The feedback control circuit of the new energy electronic lock according to claim 3, wherein:

the amplifying circuit comprises:

an operational amplifier which is connected with an analog ground and the VCC; and a limit resistor having a first end that is connected to the feedback pin of the driving module, and a second end that is grounded; and the limit resistor pulls the first driving current up to the voltage and inputs the voltage to the operational amplifier.

6. The feedback control circuit of the new energy electronic lock according to claim 5, wherein the operational amplifier comprises:

an operational chip;

a balance resistor which is connected to a high voltage side of the limit resistor and a non-inverting input end of the operational chip respectively;

an external resistor which is connected to a low voltage side of the limit resistor and an inverting input end of the operational chip respectively; and a feedback resistor which is coupled to the inverting input end of the operational chip and an output end of the operational chip.

7. The feedback control circuit of the new energy electronic lock according to claim 6, wherein:

the sampling module comprises:

a voltage-dividing current limiting circuit which is connected to the output end of the operational chip; and a filtering circuit which is connected to the voltage-dividing current limiting circuit;

the voltage-dividing current limiting circuit is configured to convert the amplified voltage into the first driving current and then input the first driving current into the filtering circuit; and the filtering circuit is configured to filter noise fluctuation of the first driving current and then input it to the control unit.

8. The feedback control circuit of the new energy electronic lock according to claim 7, wherein;

the voltage-dividing current limiting circuit comprises a first voltage-dividing current limiting resistor and a second voltage-dividing current limiting resistor;

a first end of the first voltage-dividing current limiting resistor is coupled to the output end of the operational chip;

a first end of the second voltage-dividing current limiting resistor is coupled to a second end of the first voltage-dividing current limiting resistor; and a second end of the second voltage-dividing current limiting resistor is grounded.

9. The feedback control circuit of the new energy electronic lock according to claim 3, wherein the control unit is further configured to:

determine the locking state of the electronic lock corresponding to the first driving current based on the first driving current and a pre-configured corresponding relationship between a preset first driving current interval and the locking state of the electronic lock.

10. The feedback control circuit of the new energy electronic lock according to claim 1, wherein further comprise:

an overtemperature protection circuit which is connected to an overtemperature protection pin of the driving module;

the overtemperature protection pin outputs a temperature signal corresponding to a temperature of the driving module to the overtemperature protection circuit; and the overtemperature protection circuit is configured to perform voltage pull-up and filtering of the temperature signal and then input it to the control unit.

11. The feedback control circuit of the new energy electronic lock according to claim 10, wherein:

the overtemperature protection circuit comprises a pull-up resistor and an overtemperature protection capacitor;

a first end of the pull-up resistor is connected to a first end of the overtemperature protection capacitor;

a second end of the pull-up resistor is connected with a TTL power supply;

a second end of the overtemperature protection capacitor is grounded; and a connection point between the pull-up resistor and the overtemperature protection capacitor is connected to the control unit and the overtemperature protection pin respectively.

12. A control method of the feedback control circuit of the new energy electronic lock according to claim 1, the control method comprising:

receiving the lock driving signal and driving the electronic lock to be locked based on the lock driving signal;

obtaining first driving current during the locking process of the electronic lock; and determining the locking state of the electronic lock based on the first driving current, and performing a predetermined action, wherein the determining the locking state of the electronic lock based on the first driving current, further comprises:

determining the locking state of the electronic lock corresponding to the first driving current based on the first driving current and a pre-configured corresponding relationship between a preset current interval and the locking state of the electronic lock, wherein the preset current interval comprises a safe interval and a dangerous interval;

the pre-configured corresponding relationship between the preset current interval and the locking state of the electronic lock:

determining that the electronic lock is in an electronic lock locked rotor state when the first driving current is in a first threshold of the dangerous interval;

determining that the electronic lock is in a fault state when the first driving current is higher than the first threshold of the dangerous interval;

determining that the electronic lock is in an open-circuit state when the first driving current is lower than a second threshold of the safe interval; and determining that the electronic lock is in a normal working state when the first driving current is in the second threshold of the safe interval.

13. The control method of the feedback control circuit of the new energy electronic lock according to claim 12, wherein the performing the predetermined action further comprises:

transmitting a locked rotor alarm instruction when the electronic lock is in the electronic lock locked rotor state;

transmitting an electronic lock abnormal instruction when the electronic lock is in the fault state; and transmitting an electronic lock open-circuit instruction when the electronic lock is in the open-circuit state.

14. The control method of the feedback control circuit of the new energy electronic lock according to claim 12, wherein the control method further comprises:

obtaining a pulse signal or an analog voltage signal from a self-feedback unit of the electronic lock; and determining the locking state of the electronic lock based on a duty cycle ratio of the pulse signal or a magnitude of the analog voltage signal.

15. The control method of the feedback control circuit of the new energy electronic lock according to claim 14, wherein the pre-configured corresponding relationship is a first pre-configured corresponding relationship, and the determining the locking state of the electronic lock based on the duty cycle ratio of the pulse signal or the magnitude of the analog voltage signal, comprises:

determining the locking state of the electronic lock corresponding to the duty cycle ratio of the pulse signal based on the duty cycle ratio of the pulse signal and a second pre-configured corresponding relationship between a preset duty cycle ratio interval and the locking state of the electronic lock; or determining the locking state of the electronic lock corresponding to the analog voltage signal based on the analog voltage signal and a third pre-configured corresponding relationship between a preset voltage interval and the locking state of the electronic lock.

16. An electronic lock for a new energy automobile, wherein the electronic lock is provided with the feedback control circuit of the new energy electronic lock according to claim 1.

* * * * *